(12) United States Patent
Ramasamy et al.

(10) Patent No.: US 10,901,918 B2
(45) Date of Patent: Jan. 26, 2021

(54) CONSTRUCTING FLEXIBLY-SECURE SYSTEMS IN A DISAGGREGATED ENVIRONMENT

(71) Applicant: INTERNATIONAL BUSINESS MACHINES CORPORATION, Armonk, NY (US)

(72) Inventors: HariGovind V. Ramasamy, Ossining, NY (US); Eugen Schenfeld, South Brunswick, NJ (US); Valentina Salapura, Chappaqua, NY (US); John A. Bivens, Ossining, NY (US); Yaoping Ruan, White Plains, NY (US); Min Li, San Jose, CA (US); Ashish Kundu, Elmsford, NY (US); Ruchi Mahindru, Elmsford, NY (US); Richard H. Boivie, Monroe, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

(21) Appl. No.: 16/204,661

(22) Filed: Nov. 29, 2018

(65) Prior Publication Data
US 2020/0174949 A1  Jun. 4, 2020

(51) Int. Cl.
*H04L 29/06* (2006.01)
*G06F 12/14* (2006.01)
*H04L 9/30* (2006.01)

(52) U.S. Cl.
CPC .......... *G06F 12/1408* (2013.01); *H04L 9/30* (2013.01)

(58) Field of Classification Search
CPC ...... G06F 21/53; G06F 21/62; G06F 21/6209; G06F 21/6218; G06F 12/1408; H04L 9/30; H04L 63/10
See application file for complete search history.

(56) References Cited

U.S. PATENT DOCUMENTS

| | | | |
|---|---|---|---|
| 7,103,782 B1 * | 9/2006 | Tugenberg ............ | H04L 9/0894 713/194 |
| 8,214,296 B2 | 7/2012 | Frank et al. | |
| 2007/0297606 A1 * | 12/2007 | Tkacik ................ | G06F 21/6218 380/239 |
| 2009/0254572 A1 | 10/2009 | Redlich et al. | |
| 2011/0060895 A1 | 3/2011 | Solomon | |

(Continued)

*Primary Examiner* — Malcolm Cribbs
(74) *Attorney, Agent, or Firm* — Griffiths & Seaton PLLC (57) ABSTRACT

Server resources in a data center are disaggregated into shared server resource pools, which include a pool of secure processors. Advantageously, servers are constructed dynamically, on-demand and based on a tenant's workload requirements, by allocating from these resource pools. According to this disclosure, secure processor modules for new servers are allocated to provide security for data-in-use (and data-at-rest) in a dynamic fashion so that virtual and non-virtual capacity can be adjusted in the disaggregate compute system without any downtime, e.g., based on workload security requirements and data sensitivity characteristics. The approach herein optimizes an overall utilization of an available secure processors resource pool in the disaggregated environment. The resulting disaggregate compute system that is configured according to the approach cryptographically-protects workload data whenever it is outside the CPU chip.

24 Claims, 6 Drawing Sheets

(56) References Cited

U.S. PATENT DOCUMENTS

| | | | |
|---|---|---|---|
| 2011/0185063 A1* | 7/2011 | Head | G06F 9/5077 709/226 |
| 2013/0191651 A1* | 7/2013 | Muff | G06F 21/72 713/193 |
| 2014/0033212 A1* | 1/2014 | Balasubramaniam | G06F 9/5038 718/102 |
| 2014/0068624 A1* | 3/2014 | Fuller | G06F 9/5011 718/104 |
| 2014/0281531 A1* | 9/2014 | Phegade | H04L 9/0825 713/168 |
| 2014/0337914 A1* | 11/2014 | Canning | H04L 63/20 726/1 |
| 2014/0359305 A1* | 12/2014 | Pappachan | H04L 9/14 713/189 |
| 2015/0033221 A1* | 1/2015 | Chari | G06F 21/53 718/1 |
| 2015/0058629 A1* | 2/2015 | Yarvis | H04L 63/0442 713/171 |
| 2015/0089062 A1* | 3/2015 | Reiter | G06F 9/505 709/226 |
| 2015/0170197 A1* | 6/2015 | Smith | H04L 9/008 705/14.41 |
| 2015/0261561 A1* | 9/2015 | Ashok | H04L 47/70 718/1 |
| 2015/0302207 A1* | 10/2015 | Sprenger | G06F 21/50 726/26 |
| 2015/0319160 A1* | 11/2015 | Ferguson | G06F 21/6281 726/10 |
| 2015/0379297 A1* | 12/2015 | Hunt | G06F 21/10 726/26 |
| 2015/0381426 A1* | 12/2015 | Roese | G06F 9/5077 709/226 |
| 2016/0283273 A1* | 9/2016 | Li | H04L 41/5051 |
| 2017/0093853 A1* | 3/2017 | Boivie | G06F 21/00 |
| 2017/0124303 A1* | 5/2017 | Baldwin | H04L 67/42 |
| 2017/0149687 A1* | 5/2017 | Udupi | H04L 67/1002 |
| 2017/0295107 A1* | 10/2017 | Salapura | G06F 9/5083 |
| 2017/0331759 A1* | 11/2017 | Li | H04L 41/5054 |
| 2018/0248949 A1* | 8/2018 | Siddappa | H04L 67/1097 |
| 2018/0284996 A1* | 10/2018 | Guim Bernat | G06F 3/067 |
| 2018/0330077 A1* | 11/2018 | Gray | H04L 9/3297 |
| 2019/0065112 A1* | 2/2019 | Schmisseur | H04L 41/5019 |
| 2019/0327144 A1* | 10/2019 | Tembey | H04L 41/5048 |
| 2019/0362083 A1* | 11/2019 | Ortiz | G06F 12/1408 |
| 2020/0036599 A1* | 1/2020 | Savov | H04L 47/70 |
| 2020/0073648 A1* | 3/2020 | Ambre | G06F 16/9024 |

\* cited by examiner

CONSTRUCTING FLEXIBLY-SECURE SYSTEMS IN A DISAGGREGATED ENVIRONMENT

BACKGROUND OF THE INVENTION

Technical Field

The present invention relates generally to data processing systems in a data center operating environment.

Background of the Related Art

Digital data sometimes is characterized as being in one of three stages: data-in-use, data-in-motion, and data-at-rest. Data-in-use refers to data in computer memory. Because of its nature, data-in-use is of increasing concern to businesses, government agencies and other institutions. In particular, data-in-use (i.e., in memory) often contains sensitive data including, without limitation, digital certificates, encryption keys, intellectual property (software algorithms, design data), and personally identifiable information. Thus, compromising data-in-use enables access to encrypted data-at-rest and data-in-motion. For example, an entity with access to random access memory can parse that memory to locate the encryption key for data-at-rest. Once the entity has obtained that encryption key, it can decrypt encrypted data-at-rest. Other threats to data-in-use can come in the form of cold boot attacks, malicious hardware devices, rootkits and boot kits.

Generalizing, security needs to be applied to all data when possible; hence, data should be encrypted in any state it is located, including in memory, in storage (disk, flash, tape, etc.), as well as when traveling from place to place through a network. Keys that are used for this encryption, however, may be placed in different locations as long as only the user owning the data can access such keys and data.

Computing resources are usually pre-configured by vendors at fixed levels of security configurations, there may be no special hardware security measures available for protecting data-in-use. When security measures are present, they are usually inflexible, they cannot be dynamically scaled up or down to match workload characteristics, and/or they are expensive.

Generalizing, data-in-use typically often is protected in one of several ways. Encryption, which prevents data visibility in the event of its unauthorized access or theft, is commonly used to protect data-in-motion and data-at-rest, and it is increasingly recognized as a preferred method for protecting data-in-use as well. To this end, there have been multiple projects that propose or provide solutions to encrypt memory. Thus, for example, it is known to encrypt memory such that only the user program can access it; this is achieved via a key that is placed in a special hardware location at the processor side and that, for each memory read or write, can be used to decrypt or encrypt the data. Other commercial software products, such as PrivateCore vCage, provide attestation along with full memory encryption for x86 servers. Techniques to provide full memory encryption implementations on a mobile general purpose commodity processor (e.g., x86 and ARM) have also been described. One approach involves using an ARM Cortex A8 processor as a substrate upon which a full memory encryption solution is built. Using this technique, process segments (for example, stack, code or heap) can be encrypted individually or in composition, and this solution provides both confidentiality and integrity protections of code and data that are encrypted everywhere outside the CPU boundary.

Another approach to protecting data-in-use is CPU-based key storage. In this approach, operating system kernel patches modify the operating system so that CPU registers are used to store encryption keys in lieu of holding encryption keys in RAM. In particular, the keys are held inside the CPU rather than in RAM so that data-at-rest encryption keys are protected against attacks that might otherwise compromise encryption keys in memory. While this approach does not protect all data-in-use, it does protect against cold boot attacks.

Still another approach to protecting data-in-use is an "enclave," which are private regions in memory. Enclave data is encrypted while in RAM but available as clear text inside the CPU and CPU cache. An enclave approach differs from simply memory encryption in that it uses special registers and circuits that sit between the memory unit and the processor and that hold the key necessary to decrypt/encrypt the data from/to memory, and no other place (including the operating system) stores the key. Special atomic instructions ensure that these registers are the only place where the key is stored. Intel has commercialized this approach as part of its Software Guard Extensions (SGX) solution. SGX is a set of instructions that allows user-level code to allocate an enclave, which unlike normal process memory, is also protected from processes running at higher privilege levels.

Yet another approach to protecting data-in-use involves cryptographic protocols. Several cryptographic tools, including secure multi-party computation and homomorphic encryption, allow for the private computation of data on untrusted systems. In these approaches, data-in-use can be operated upon while encrypted and never exposed to the system that is doing the processing.

There remains a need to adapt computing systems to provide for flexible security measures that protect data-in-use, data-in-motion and data-at-rest. This disclosure addresses that need in the context of one such system, namely, a disaggregated computing system, as is now described.

BRIEF SUMMARY

According to a first aspect, a method is provided to protect information in a disaggregated compute environment. The disaggregated compute environment comprises a set of resource pools including a secure processor pool. In response to a workload request having a security requirement, a server entity is provisioned. The server entity is composed of resources drawn from the resource pools, and the server entity includes a secure processor drawn from the secure processor pool, and a memory drawn from a memory pool. A memory drawn from the memory pool typically holds data, state, programs or other information, whereas a secure processor also may have its own dedicated memory (sometimes referred to herein as "processor memory") to facilitate the operation of the secure processor. A secure object to execute in the server entity is constructed. Further, certain cryptographic information is associated with the server entity. Using the cryptographic information, the server entity is configured such that the secure object is stored encrypted in the memory. Moreover, the secure object is in decrypted form only when the secure object is inside the secure processor (or its associated processor memory) during an execution of the secure object by the secure processor after its retrieval from the memory.

Within the above-described operating context, preferably there are two (2) distinct types of cryptographic information: first cryptographic information associated with each processor within a processor pool, and second cryptographic information associated with an individual user (e.g., a tenant, or an individual associated with a tenant) and used to secure information that the user desires to maintain private. The first cryptographic information preferably comprises a key-pair, and each secure processor of the processor pool has its own key-pair, namely, a private key and its associated public key. Thus, there is a private key associated with each secure processor. The second cryptographic information also preferably comprises another key-pair associated with the individual user. The private key of the individual user key-pair is known only to the individual user. According to this disclosure, secure processor keys comprising the first cryptographic information are used to securely communicate a user key (the second cryptographic information associated with the individual user) among the processors that comprise the processor pool. Preferably, the processor private keys are maintained in a special "privileged" table by a security manager component, which provides each new processor that is added to the data center a copy of the privileged table. In this approach, the security manager is able to recognize and accept the public keys of processors that are authorized, and to update the privileged table (to include the secure processor private keys) as new processors are added. This approach provides a secure execution environment for code and data, as was as security of data-at-rest within the disaggregated environment.

The aspects of the disclosure outlined above provide significant advantages. Server resources in a data center are disaggregated into shared server resource pools, which include a pool of secure processors. Advantageously, servers are constructed dynamically, on-demand and based on a tenant's workload requirements, by allocating from these resource pools. According to this disclosure, secure processor modules for new servers are allocated to provide security for data-in-use (and data-at-rest) in a dynamic fashion so that virtual and non-virtual capacity can be adjusted in the disaggregate compute system without any downtime, e.g., based on workload security requirements and data sensitivity characteristics. The approach herein optimizes an overall utilization of an available secure processors resource pool in the disaggregated environment. The resulting disaggregate compute system that is configured according to the approach cryptographically-protects workload data whenever it is outside the CPU chip. Thus, for example, the protection covers the workload data while the data is in a memory instance of a memory resource pool, while swapped out on a disk of the disk resource pool, while in the file system prior to execution, and while in-transit (e.g., prior to installation in a file system, when a workload is suspended from execution and its encrypted corresponding memory enclave is detached from other resources in the resource pools but is anticipated to resume execution with other resources from the secure resource pool).

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

The techniques of this disclosure preferably are implemented within the context of a "disaggregated" compute system wherein a "disaggregated server"—sometimes referred to herein as a "server entity"—is composed or constitutes server resources selected from (or assigned from) shared server resource pools, namely, one or more of: a compute pool, a memory pool, an accelerator pool (e.g., a GPU accelerator, a network accelerator, etc.), a storage pool, and, as will be described below, a security-augmented (or "secure") processor pool. As the nomenclature suggests, a "compute" pool typically constitutes physical processors (such as CPUs), a "memory" pool typically constitutes physical memory devices (such as dual-inline-memory modules (DIMM)), etc. A given shared pool preferably includes just the particular resource types, but a particular resource pool may be composed of one or more resource sub-types. The notion of a "pool" is not intended to be limiting, as the common resources may be collected, aggregated or otherwise combined in any suitable manner. Further, a "pool" may be a dedicated set of resources that have the common type or sub-type, or some ad hoc collection of such resources. Preferably, a particular server entity comprises server resources from one or more of the server resource pools.

In a preferred embodiment, and as now described below, a disaggregated compute system in which the teachings of this disclosure are practiced utilizes optical interconnects for memory, although this is not a limitation.

Typically, the shared resource pools are available within the physical confines of a particular data center, although this likewise is not a limitation. Thus, the shared resource pools themselves may be shared across physical data centers. Further, a particular server entity is not required to be composed of resources from each of the server pools.

Disaggregated Server Systems

The following provides additional details regarding disaggregated compute system management and use.

In this approach, preferably resources in or across one or more data centers are disaggregated into shared resource pools, namely, one or more of: a compute pool, a memory pool, an accelerator pool, a storage pool, and the like. Servers preferably are constructed dynamically, for example, on-demand and based on workload requirements, by allocating from these resource pools. Preferably, a disaggregated compute system of this type keeps track of resources that are available in the shared resource pools, and manages those resources based on that information.

A tracking mechanism associated with the disaggregated compute system typically includes a database. The database stores data that tracks resource state or status (e.g., idle or used CPUs, memory, accelerator, and other components) of the various resources that define a server available from the resource pools. Additionally, the database stores a data record (or, more generally, a data set) that, for each defined server (sometimes referred to as a "server entity"), identifies the resources (e.g., the CPU(s), memory, accelerator, or other components) that comprise the server. Preferably, the data record is associated with an identifier, such as a unique server ID, and each resource that comprises the server is associated in the database with that unique server identifier. The individual components of the resource pools also include identifiers that are tracked in the database. The resource-specific identifiers provide information regarding the resource status, attributes, relationship to other resources, and the like. Thus, the database, which may be centralized or distributed, acts a repository of information regarding server entities, the server pools, and the various resources that comprise a particular server entity.

In response to a request for data center resources, e.g., when allocating a new server, a server entity is defined by selecting resources from the one or more resource pools. The resources may be selected based on a projected need or specified demand associated with the request, or some other criteria. The server entity is associated with the unique server ID, which is stored in the database together with the identifiers for the resources that comprise the server entity. The server entity may then be scaled up or down as necessary based on the workload requirements of the request or one or more related or associated requests.

Thus, for example, as the request is processed, or as additional related requests are received for processing, the tracking system monitors usage to determine if an adjustment to the resources comprising the server entity is needed. When, based on the monitoring, the tracking system determines that an adjustment in the server entity components is necessary, the adjustment is carried out, e.g., by changing the allocation of resources that are associated with the server entity. Thus, for example, when additional compute and memory are needed (scale-up), the tracking system (by itself, or by cooperation with other resource provisioning systems in the data center) adjusts the server entity, e.g., by selecting additional processors and memory, which are then added to the server entity. These additional processors and memory may be selected based on one or more criteria, such as load, proximity to the existing resources that comprise the server entity, availability, and the like, as indicated by the information being maintained and tracked in the database. When, on the other hand, the monitoring indicates that fewer resources are required (scale-down), the tracking system adjusts the server entity, e.g., by de-selecting certain processors and memory, which are then de-allocated from the server entity and returned to their respective resource pools.

Figure 1:
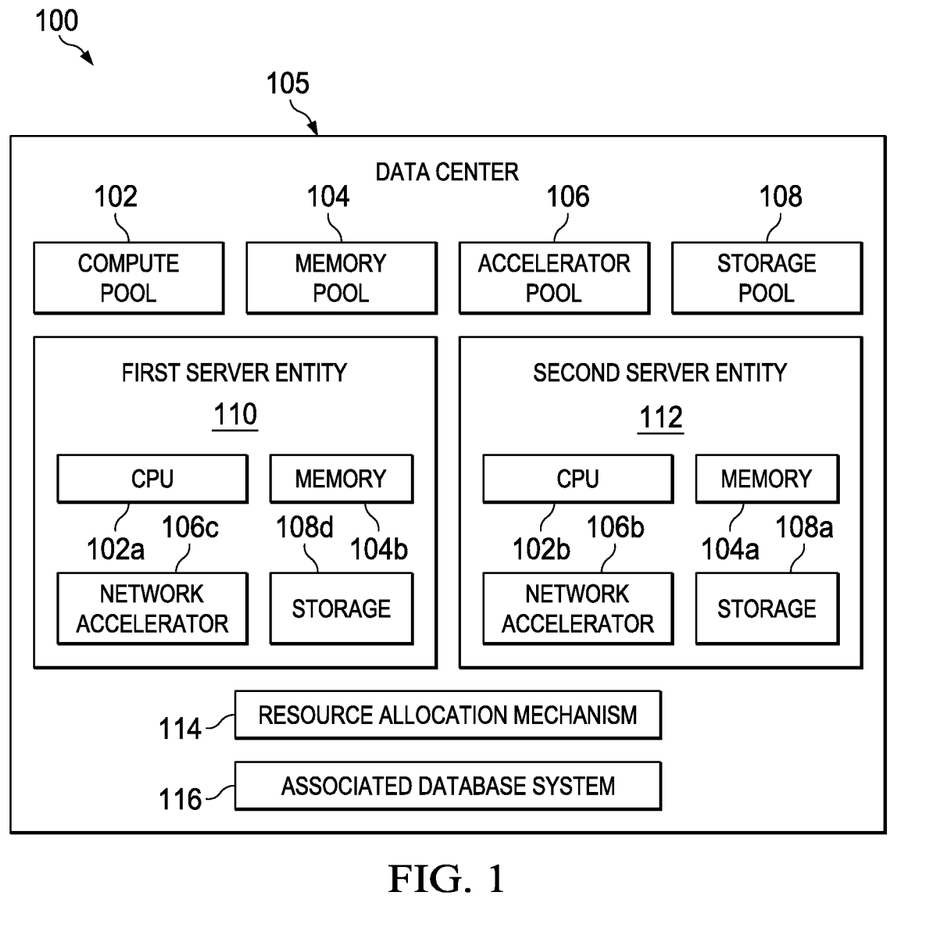
FIG. 1 depicts a data center architecture in which the techniques of this disclosure may be implemented.

With reference now to FIG. 1, a method and system for specifying a disaggregated compute system 100 in this manner is depicted. In one approach, the disaggregated compute system 100 is configured within a data center 105 in which a switching optically-connected memory architecture is used, although this is not a limitation as the disaggregate server approach can be implemented in a conventional cloud (public, private or hybrid) environment. In the disaggregated compute system 100, there are shared server pools, e.g., a compute pool 102, a memory pool 104, an accelerator pool 106, a storage pool 108, and perhaps others. There may be a single instance of a resource pool, or multiple such instances (sometimes referred to as "multiple pools"). In the approach herein, particular servers that service customer workloads are constructed dynamically, for example, on-demand and based on workload requirements, by allocating from these resource pools. Thus, for example, a first server entity 110 may comprise CPU 102*a* (selected or otherwise obtained from compute pool 102), memory 104*b* (selected or otherwise obtained from memory pool 104), accelerator 106*c* (selected or otherwise obtained from accelerator pool 106), and storage 108*d* (selected or otherwise obtained from storage pool 108). A second server entity 112 may comprise CPU 102*b*, memory 104*a*, accelerator 106*b* and storage 108*a*. These examples are merely representative. The particular server pool resources that comprise a given server entity may change.

Preferably, once a particular resource of a resource pool is associated with a given server entity, that particular resource is not available to be used to constitute another server entity. Stated another way, preferably an allocated resource of a resource pool remains associated with the server entity until it is de-allocated, at which point the resource is returned back to the resource pool and can be used again by another server entity. Although not intended to be limiting, preferably a server entity (once created) is associated with one and only one data center customer (tenant). In other words, server entities preferably are not shared across tenants.

To manage such allocations and de-allocations, the disaggregated compute system 100 has the capability to keep track of resources that are available in the shared server resource pools and that are allocated or de-allocated to the various server entities. To this end, the disaggregated compute system 100 comprises (or has associated therewith) a tracking system comprising a resource allocation mechanism 114, and an associated database system 116. Generally, the tracking system is implemented as a data processing system, and it may operate in a standalone manner or as a component of some other system or functionality in the data center.

Typically, the resource allocation mechanism 114 is implemented in software, namely, as set of computer program instructions, executing in one or more hardware processors. The resource allocation mechanism 114 may comprise one or more sub-systems or modules, processes, programs or execution threads, and such components may be co-located or distributed. The resource allocation mechanism 114 generally is responsible for executing one or more allocation algorithms that create and manage server entities. Representative algorithms include, for example, a new server allocation algorithm that is used to perform an initial build of the server entity, a server scale-up algorithm that in the case of an existing server is used to add more resources to the existing server entity when more capacity is needed to handle the workload, and a server scale-down algorithm that in the case of an existing server is used to de-allocate (shed) resources from the existing server entity when less capacity is needed to handle the workload.

The one or more algorithms that comprise the resource allocation mechanism 114 used information stored in the database system 116 to carry out the management functions. The database system 116 stores information that tracks the state, status or other properties and attributes of the various resources in the shared server pools. In addition, the database stores information about each server entity built by the resource allocation mechanism.

Flexibly Secure Computing Systems in a Disaggregated Environment

With the above as background, the techniques of this disclosure are now described.

According to this disclosure, and as noted above, the shared resource pools are expanded to include a security-augmented (or "secure") processor pool. The secure processor pool may be a subset of the processor pool, or its own standalone resource pool. The secure processor pool is dedicated to secure processors that are capable of carrying out cryptographic (or similar) operations, although these secure processors may also be used to process data in the clear. Secure processors typically are implemented in hardware, and a given secure processor from the pool typically is implemented as a processor chip that comprises a CPU core, together with supporting devices (e.g., processor memory (caches), I/O, etc.).

As described above, disaggregated servers (the server entities) are constructed dynamically, on-demand and based on a tenant's workload requirements, by allocating from these resource pools. When the workload (typically executable code and/or data) is such that security requirements are dictated or must otherwise be enforced, a disaggregate server is constructed to include one or more secure processors drawn from this secure processor pool.

Figure 2:
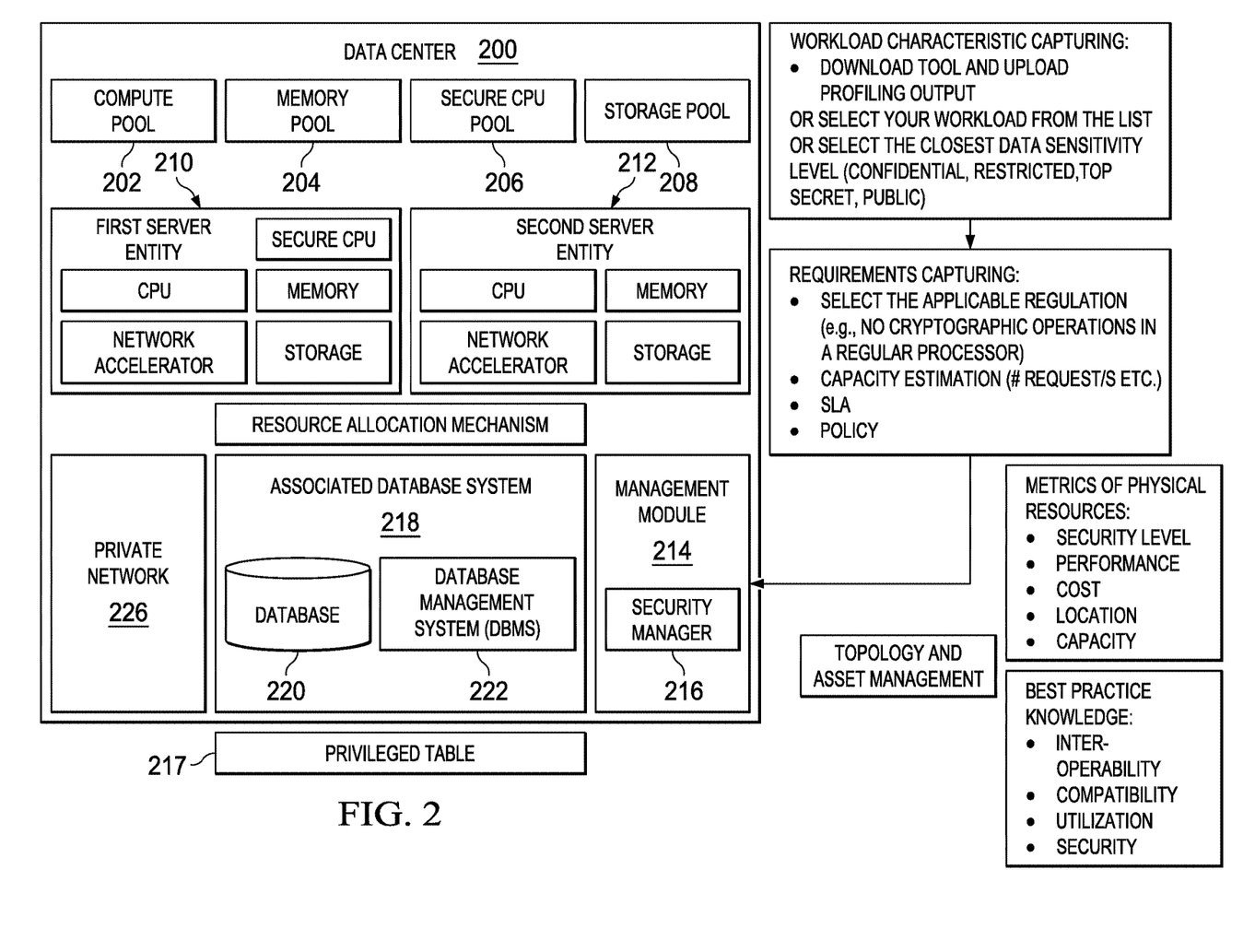
FIG. 2 depicts the architecture of FIG. 1 that is augmented to include secure processor resource pools together with a management infrastructure according to this disclosure.

Thus, and with reference to FIG. 2, an embodiment of a disaggregate compute system 200 includes the elements shown in FIG. 1 including the compute pool 202, the memory pool 204, the storage pool 208, as well as a secure processor pool 206 that includes secure hardware resources that perform cryptographic operations. First and second server entities 210 and 212 are configured as before, except that a particular server entity (e.g., 210) is also configured to include a secure processor from the pool 206. The system also includes a resource allocation mechanism in the form of a management module 214 that includes a security manager 216. As in FIG. 2, the system includes an associated database system 218 having a database 220 and database management system 222 for storing information useful in provisioning, administration and operations. Some of the information stored in the database include topology and asset management data, metrics of physical resources (e.g., security level, performance, cost, location, capacity, etc.), a knowledgebase of best practices (e.g., concerning interoperability, compatibility, utilization and security, etc.) and so forth.

According to an aspect of this disclosure, the management module 214 is part of a management layer that includes a separate, privileged network 226 that, preferably, is not accessible by a user or otherwise from outside the data center (e.g., the public Internet). As will be seen, the management layer facilitates and manages the provisioning and use of servers that include the secure processors (such as server entity 210 but not server entity 212) to ensure that sensitive data in the workload is not exposed, either to physical attack or to other software executing on the disaggregated system.

As also depicted in FIG. 2, the security manager 216 has associated therewith a data table 217 that is a privileged table in that preferably only the security manager 216 can access it. As will be described below, the privileged table 217 secures private keys associated with processor key-pairs.

As used herein, a workload typically includes executable code and data. When that executable code and data needs to be secured according to some security requirement that dictates processing within a server entity (or "target server") that includes a secure processor, the code may be packaged as a secure object, sometimes referred to herein as well as a "secure executable." When such security constraints are required, a security goal will be to ensure that the secure executable and its data are only visible in the clear when a CPU in a secure processor is executing the secure executable, but that the secure executable code and its data are encrypted elsewhere (e.g., within a memory instance from the memory resource pool). In addition, when a secure object is being held in memory or other data storage (drawn respectively from the memory or storage pools), another security goal is to ensure that the contents thereof are not accessible (in the clear) by other software. Thus, while a particular memory from the memory resource pool can hold multiple secure objects, each of the secure objects are protected from one another, as well as from other software in the disaggregate compute environment.

Referring back to FIG. 2, through its security manager 216, management module 214 is responsible for receiving workload security requirements, data sensitivity characteristics, information about available resources in the pools, and the like, and in response determining a composition of a server having the secure processors or other resources needed for processing the workload and enforcing the security requirements. To this end, the management module 218 may include a tool or other interfaces for capturing workload characteristics. The tool may expose one or more user interfaces by which a user can select a workload from a list, and then associate an appropriate data sensitivity level (e.g., confidential, restricted, top secret, public, etc.) for use when the workload is processed. The management module preferably also exposes an interface by which the user can identify one or more security requirements such as "no cryptographic operations in a regular processor," "perform cryptographic operations with a secure processor of type x," etc. Other workload processing requirements (e.g., capacity estimation, SLA, policy, etc.) may also be specified, or selected from default options. The information is captured and stored in the database 220.

Prior to runtime, the management module uses such information, as well as information about data center topology, availability of resources, physical resource metrics, data center best practices, etc. to compose the initial server entity that will be used to process the workload. The "resource allocation" mechanism described above with respect to FIG. 1 may be used for this purpose. Processing of the workload then begins.

As noted above, during runtime execution of the workload, the server composition may need to be modified (e.g., scaled-up or scaled-down), in which case the security manager 216 also needs to keep track of all available secure hardware resources and their tenant workload mappings so that adjustments to the server entity can be made as necessary. This adjustment process may be carried in the manner described above with respect to FIG. 1 using the security manager to perform resource allocation.

As adjustments to the server entity occur, however, any secure executable needs to remain protected, whether "in-use," "in-motion" or "at-rest." To this end, and according to this disclosure, the security manager 216 uses its associated privileged network 226 to communicate cryptographic key information to local processor memories (caches) associated with each secure processor in which the sensitive data may be processed. (These local memories are on the processor chip and thus should be distinguished from the memory drawn from the memory pool). The keys are used to protect the sensitive information and, in particular, to ensure that the code is only available in the clear within a secure processor whose CPU is executing that code.

Figure 3:
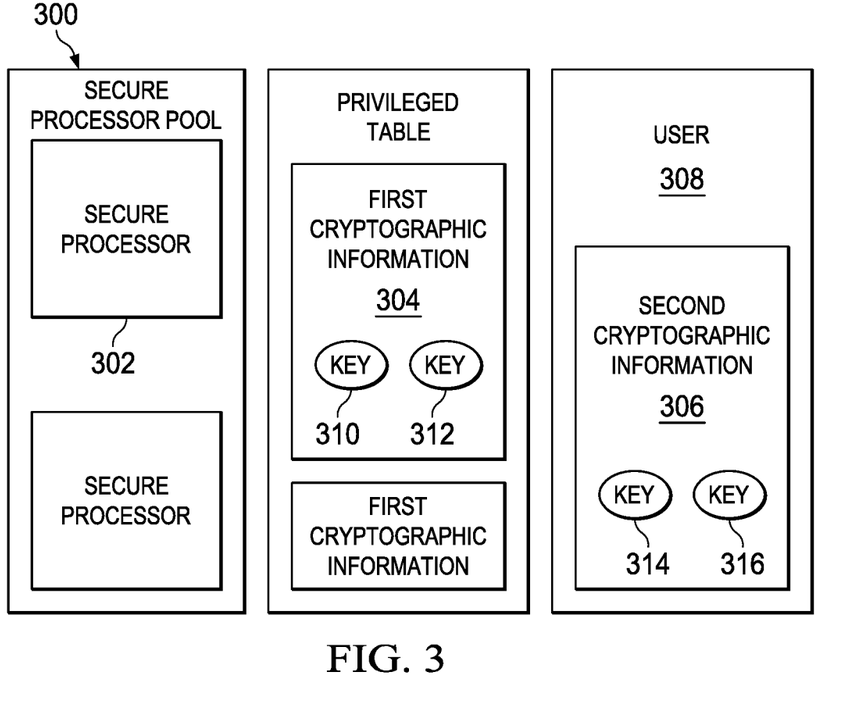
FIG. 3 depicts a key management scheme according of this disclosure wherein each secure processor in a processor pool has an associated key-pair that is unique to the secure processor.

Within the above-described operating context, preferably there are two (2) distinct types of cryptographic information as depicted in FIG. 3: first cryptographic information 304 associated with each secure processor 302 within a processor pool 300, and second cryptographic information 306 associated with an individual user (e.g., a tenant, or an individual associated with a tenant) 308 and used to secure information that the user desires to maintain private. The first cryptographic information 304 preferably comprises a key-pair, namely, and each processor has its own key-pair that includes a private key 310 and its associated public key 312. Thus, in this embodiment there is a private key 310 (and its related public key 312) associated with each secure processor 302. The second cryptographic information 306 also preferably comprises another key-pair (private key 314 and related public key 316) associated with the individual user. The private key 314 of the individual user key-pair is known only to the individual user (or an entity trusted thereby). The security manager does not know and cannot ascertain the individual user private key 314.

According to this disclosure, private keys 310 of the secure processors and comprising the first cryptographic information are used to securely communicate user keys (the second cryptographic information associated with the individual user(s)) among the processors that comprise the processor pool. As noted above, preferably the processor private keys 310 are maintained in the privileged table 217 by the security manager 216, which provides each new processor that is added to the data center a copy of that table. In this approach, the security manager 216 is able to recognize and accept the public keys of processors that are authorized, and to update the privileged table 217 (to include their unique private keys) as new processors are added. As will be seen, this approach provides a secure execution environment for code and data, as was as security of data-at-rest within the disaggregated environment.

The above-described approach requires the security manager 216 to place the private key (of each processor key-pair) in the privileged table for each processor in the pool, and thus the security manager has to know and manage the key-pairs for each possible processor in the system.

As described, the private key of each key-pair in the first cryptographic information is distinct from every other private key of other such key-pairs (for the other processors in the pool), as well as distinct from the private key of each key-pair in the second cryptographic information.

Preferably, the source of trust for the public key in each key-pair preferably comes from a digital certificate signed by root-of-trust (e.g., Verisign).

In a further variant, the first cryptographic information need not be a "key-pair" but, rather, may be a single secret key.

As used herein, the public part of the user key-pair is sometimes referred to herein as a user decipher key, whereas the private part of that key-pair is sometimes referred to the user encryption key.

Typically, the cryptographic key information is made available to the participating entities as needed in advance of any movement or positioning of the workload in the server entity, although this is not a requirement.

As noted above, the second cryptographic information as described above is used to secure information associated with an individual user or a workload associated with that user. To this end, the second cryptographic information typically includes a first (e.g., symmetric) key for encrypting the executable code and data of the workload (to create the secure executable). The symmetric key typically is generated by an owner of the code or data sought to be protected, namely, the user. To protect the executable code and data workload, the security manager 216 distributes the user symmetric key (e.g., key 314) encrypted by the processor public key (e.g., key 312) that is specific to the secure processor in the server. The code and data are protected under the first key-pair and, as such, are only available in the clear when the secure processor is executing them. The code and data, however, preferably are not available to any other server entity, or even to other software on the same server. Thus, as the sensitive code and data is processed within the disaggregate compute system (whether "in-use," "in-motion" or "at-rest"), it remains flexibly and provably-secure.

As noted above, the security manager maintains the privileged table to host the processor key-pairs, and thus the security manager is responsible for passing the keys to the secure processors within the pool.

The management module and its security manager may be a system, sub-system, device, process, program or combination thereof. Various functions that comprise the management module and its security manager may be integrated, co-located or remote from one another. One or more functions or sub-functions may be components of other systems. Thus, the particular implementation for the management module and its security manager is not intended to be limited by any such constraints.

Figure 4:
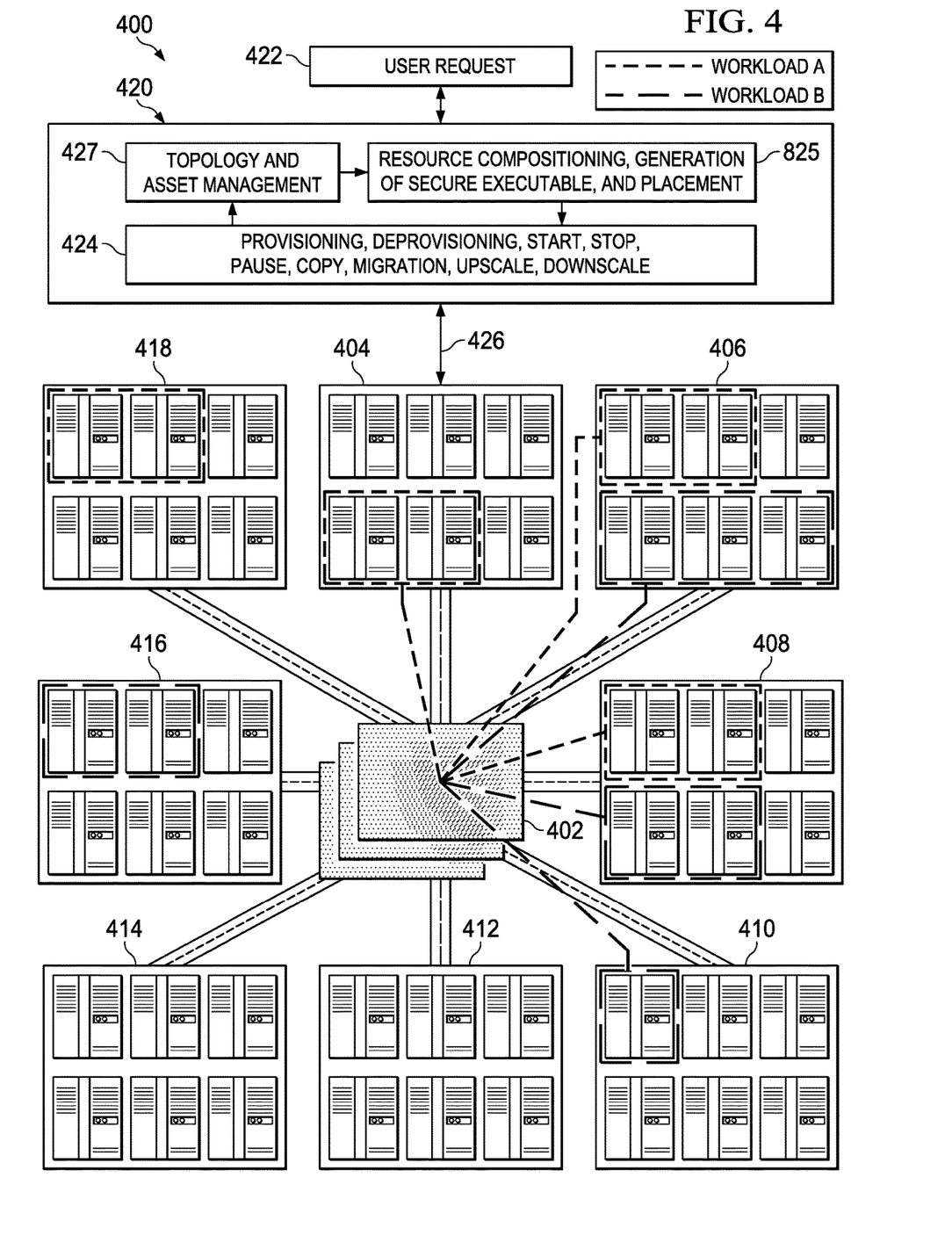
FIG. 4 depicts a representative implementation of server entities that are provisioned to include secure processors from the secure processor resource pool using one of the key management schemes described.

FIG. 4 depicts the system architecture of this disclosure showing how the secure executable and its data are protected throughout the environment regardless of whether it is "in-use," "in-motion" or "at-rest." More generally, the techniques herein ensure that the workload is cryptographically-protected whenever it is external to (in other words, "outside") one of the secure processors (and its processor memory). In the example shown in FIG. 4, the disaggregate compute system 400 comprises a number of resource pools connected by the optical switch fabric 402. These resource pools include, working clockwise, a first conventional processor pool 404, a memory pool 406, a storage pool 408, a first secure processor pool 410 (e.g., of Type 1), a second conventional processor pool 412, a I/O resources pool 414, a second storage pool 416, and a second secure processor pool 418 (e.g., of Type 2). Of course, the number of such pools, their identities, and their configuration, may vary.

As depicted, and for example purposes only, there are two (2) workloads executing on two server entities, with workload A executing on a server entity composed of resources from secure processor pool 418, processor pool 404, memory pool 406 and storage pool 408, and workload B executing on a server entity composed of resources from memory pool 406, storage pools 408 and 416, and secure processor pool 410. Of course, these server entity compositions are merely exemplary. As also shown, the management module 420 is responsive to the user requests 422 for instantiating and managing the server entities. As depicted, the resource allocation includes various functions 424, such as provisioning, start, stop, pause, copy, migration, scale-up, and scale-down. The management module also is responsible for composing the resources necessary to generate the server entity, generation of the secure executables (by applying the owner's symmetric key), and the placement of those executables with the secure processors, all as depicted at function 425. The placement of the secure executable is facilitated using the privileged network 426, as previously noted. As also depicted, as the server entities are configured, or as those configurations as adjusted dynamically, information is reported back to a topology and asset management function 427, which keeps track of available resources from the resource pools.

Figure 5:
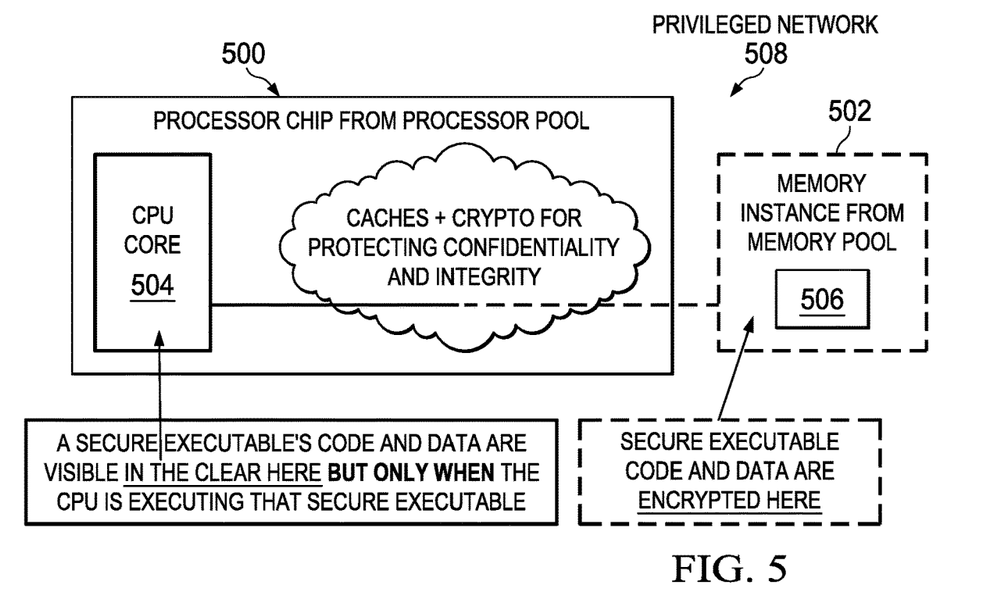
FIG. 5 depicts a secure processor configured in association with a memory instance according to this disclosure.

FIG. 5 depicts a secure processor 500 drawn from the secure hardware pool, and a memory 502 drawn from the memory pool. As shown, the secure processor 500 includes a CPU core 504 in which the secure executable and data 506 are visible in the clear, but only when the CPU core 504 is executing the secure executable. Prior to such execution, the secure executable code and data 506 are stored in the memory 502 in an encrypted form such that the code and data are not visible to other software or other such secure objects. The secure executable code and data 506 also are not visible as they are transferred from the memory 502 to the CPU core 504. As noted above, preferably the secure executable and data 506 are placed in the memory 502 by the management module using the privileged network 508.

Figure 6:
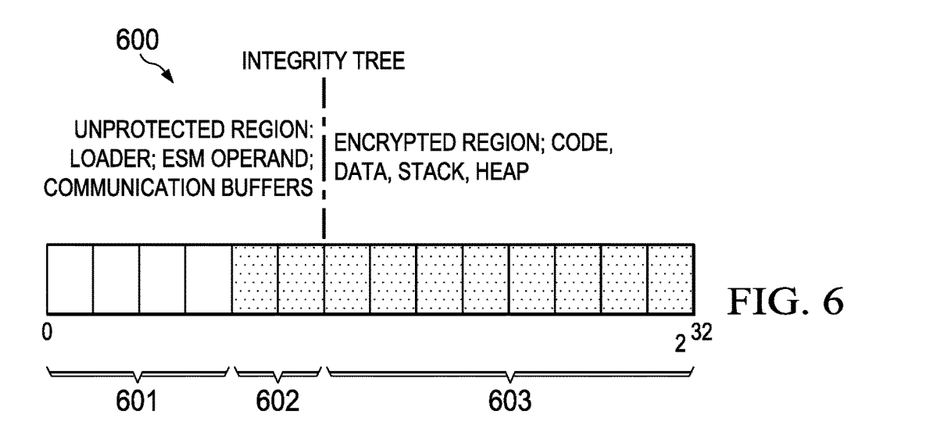
FIG. 6 illustrates an exemplary format of an executable file that includes secure object-based software.

When the security manager builds secure object software for a target machine (and, in particular, a secure processor in a disaggregate server entity), preferably the building is done in a secure environment, meaning that the both the secure object under construction and the construction process itself are not subject to attack (physical- or software-based). FIG. 6 illustrates an exemplary format of an executable file 600 that includes secure object-based software. The file contains (1) loader code including an ESM instruction (in 601) to "Enter Secure Mode," (2) an initial version of an integrity tree 602 that is used at run-time to protect the integrity of the secure object's code and data, and (3) the secure object code and data in encrypted form 603. An ESM instruction allows a secure object's sensitive information to be decrypted on the path from external memory into the CPU and encrypted on the path from CPU to external memory. Stated another way, the secure object, as tangibly embodied in a computer-readable storage medium, includes: a cryptographically-protected region containing at least one of code and data; an initial integrity tree that protects an integrity of contents of the cryptographically protected region; and an unprotected region that includes a loader, an ESM (enter secure mode) instruction, and one or more communication buffers.

Figure 7:
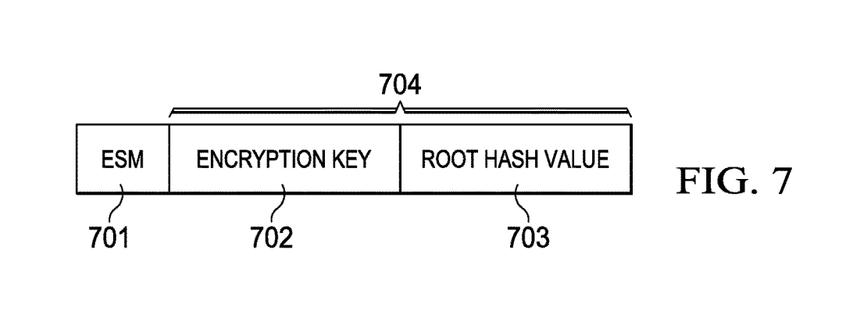
FIG. 7 shows an exemplary implementation of the ESM instruction that is used to enter secure mode.

FIG. 7 shows an exemplary implementation 700 of the ESM instruction that is used to enter secure mode. The ESM instruction has an operand 704 that includes in encrypted form the encryption key 702 that is used to decrypt and encrypt secure object code and data as that information moves between the CPU and external memory, together with the initial value 703 of a root of a hash tree that protects the integrity of the secure object code and data. At run-time, this operand is decrypted using the system key of the target machine. As noted above, the system key is the private key of a public key-pair for the secure processor of the target machine, and this is the private key managed by the security manager using the privileged table. An ESM instruction 701 loads the encryption key used for decryption/encryption of the secure object, and loads the root hash value that will be used with the hash tree in a clear text region to protect the integrity of the secure object. The ESM instruction also assigns an object ID ("OID") that the CPU and the operating system can use to refer to this secure object.

Figure 8:
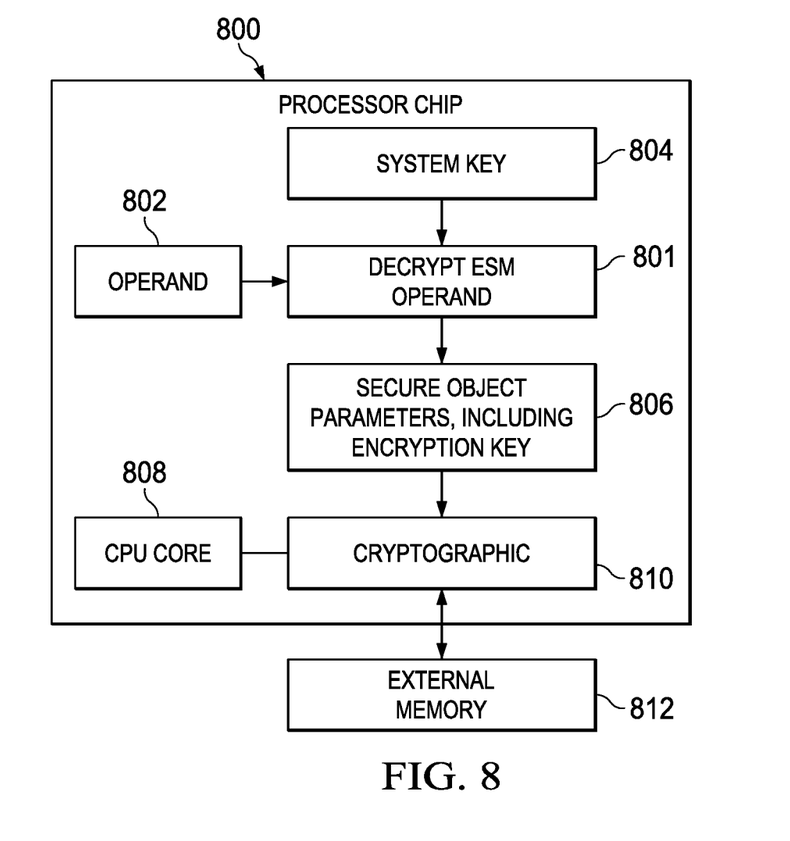
FIG. 8 shows an exemplary operation of the ESM instruction.

FIG. 8 illustrates the processing that occurs during execution of the ESM instruction used to enter secure mode and load the cryptographic keys. The secure object's keys are not "in the clear" in its ESM instruction. Rather, as shown in step 801, the ESM operand 802 is decrypted under the secure processor system key 804. This decryption produces several secure object parameters 806 including the encryption key for the secure object's code and data, and the initial root of the hash tree. As noted, other software does not have access to the system key and cannot decrypt the ESM operand 802, and such other software cannot use the secure object's operand without generating an integrity exception because the integrity tree ensures that only the unmodified secure object software can use that operand.

As depicted in FIG. 8, a central processing unit (CPU) core 808 on the processor chip (from the secure processor pool) 800 thus includes a support mechanism for an ESM (enter secure mode) instruction to cause the CPU core to execute a secure object. In particular, the ESM instruction uses the system key to decrypt the operand, and then uses the resulting decrypted operand to load an encryption key register that enables the CPU 808 to apply the cryptographic function 810 to the encrypted secure object as portions of the secure object move from an external memory 812 into the CPU core 808; and to load a root of an initial integrity tree.

Thus, in the approach described, an encryption key for the secure object is generated or provided to the management module, and the secure object is encrypted under this encryption key. This is the user private key described above. A system key (which corresponds to the processor private key described above) is maintained (in the privileged table) for the secure processor of a server entity that may be used to host and process the secure object. The system key is distributed by the security manager to each such secure processor chip on that secure processor, where preferably it is written into the processor's system key register; that register is not accessible by software but is used by the CPU hardware in the processing of an ESM instruction. At run-time, the ESM instruction is used to enter secure mode. The ESM instruction enables the secure object's sensitive information to be decrypted on the path from external memory into the CPU and encrypted on the path from CPU to external memory.

For deployment of the secure object, the security manager uses the system key (the processor's private key stored in the privileged table) to encrypt the operand. Once the operand is encrypted under the system key, the secure object code can be deployed to the server entity that includes the secure processor. As described, during runtime, the private key is used by the ESM instruction to decrypt the operand. Further details of this process may be found in U.S. Pat. Nos. 8,578,175 and 8,954,752, the disclosures of which are incorporated herein by reference.

Thus, according to the above-described technique, the security manager constructs a file comprising a secure object to execute on a target disaggregate server, the secure object comprising code and/or data that is remains encrypted when the secure object is stored in a server memory or on a disk of the target disaggregate server. The target disaggregate server is configured such that the encrypted stored secure object is in decrypted form on the disaggregate server only when information of the secure object is inside a secure processor of the server entity during an execution of the secure object by the disaggregate server after retrieval from a memory of the disaggregate server. The decryption preferably uses a system key of the server entity that is available to the processor of the disaggregate server but protected from software on the disaggregate server, the server then encrypting information of the secure object as that information moves from the processor to the memory or disk.

More generally, and in response to a workload request, the security manager composes the server entity, and builds the secure object. Preferably, the file for the secure object is constructed by the security manager except for a portion thereof that requires the system key of the disaggregate server for its completion. The security manager need not have a system key associated with the server to carry out these operations. Using the privileged network, the security manager then transmits the partially-complete secure object to the disaggregate server for completion. At the server entity, the construction of the secure object is completed, and then secure object is stored in an encrypted state in a memory or disk of the server entity. To facilitate these operations, the server entity is securely associated with a public key pair comprising a public key and a private key. The server entity uses the private key of the public key pair as the system key, and the security manager uses the public key in constructing the secure object. After the security manager communicates the secure object to the server entity, the server entity can execute the code and data in the secure object by using the private key for decryption.

The techniques described herein provide significant advantages. Server resources in a data center are disaggregated into shared server resource pools, which include a pool of secure processor modules. Advantageously, servers are constructed dynamically, on-demand and based on a tenant's workload requirements, by allocating from these resource pools. According to this disclosure, secure processor modules for new servers are allocated to provide security for data-in-use (and data-at-rest) in a dynamic fashion so that virtual and non-virtual capacity can be adjusted in the disaggregate compute system without any downtime, e.g., based on workload security requirements and data sensitivity characteristics. The approach herein optimizes an overall utilization of an available secure processors resource pool in the disaggregated environment. The resulting disaggregate compute system that is configured according to the approach cryptographically-protects workload data whenever it is outside the CPU chip. Thus, for example, the protection covers the workload data while the data is in a memory instance of a memory resource pool, while swapped out on a disk of the disk resource pool, while in the file system prior to execution, and while in-transit (e.g., prior to installation in a file system, when a workload is suspended from execution and its encrypted corresponding memory enclave is detached from other resources in the resource pools but is anticipated to resume execution with other resources from the secure resource pool).

The approach also leverages secure CPU technologies that protect the confidentiality and integrity of the secure executable and data not only from physical attack but also from all the other software on parts of the disaggregated system including privileged software, as well as against malware that might otherwise infect privileged software to obtain root privilege.

The technique also leverages a management mechanism having its own private and privileged network that is not accessible by users or from the Internet. Together with a trust model for key sharing across the disaggregate environment, the security mechanisms ensure a root-of-trust that fully protects sensitive code and data in all of its states. The technique enables a secure processor to continue processing a workload that has been stored or even processed (e.g., by another secure processor) elsewhere in the disaggregate environment. The sensitive code and data remain highly-secured and protected throughout their transfer or storage in the environment, with the secure executable being available in the clear only within the confines of a secure processor that is permitted to execute that code.

By way of example only, the security manager described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various data center architectures including simple n-tier architectures, web portals, federated systems, and the like. The herein also may be practiced in a loosely-coupled server (including a "cloud"-based) environment, whether, private, public, or hybrid.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the security manager is implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The security manager (or components thereof) may be part of the management module or a separate resource allocation mechanism. The security manager may operate as a standalone service that is used by multiple data centers that implement disaggregate compute environments. In addition, the pool of secure processors may be shared across data centers.

The techniques herein generally provide for the above-described improvements to a technology or technical field, as well as the specific technological improvements to workload management schemes, such as described above.

The invention claimed is:

1. A method to protect information in a disaggregated computing environment, the disaggregated computing environment comprising a set of server resource pools including a secure processor pool, comprising
    responsive to a workload request having a security requirement, instantiating, in real-time, a server entity composed of resources drawn from the server resource pools, the server entity including a secure processor drawn from the secure processor pool, and a memory drawn from a memory pool, wherein the secure processor is selected for inclusion in the instantiated server entity based upon the secure processor being listed in a privileged table indicative of which processors in the disaggregated computing environment are maintained in the secure processor pool;
    constructing a secure object to execute in the server entity;
    associating cryptographic information with the server entity; and
    using the cryptographic information, configuring the server entity such that the secure object is stored encrypted in the memory; wherein the secure object is in decrypted form only when the secure object is inside the secure processor during an execution of the secure object by the secure processor after retrieval from the memory.

2. The method as described in claim 1 wherein the cryptographic information comprises a key-pair uniquely associated with the secure processor.

3. The method as described in claim 2 wherein the key-pair comprises a private key, and an associated public key, wherein the secure object is constructed at least in part using the public key, and wherein the private key is used to decrypt to secure object into the decrypted form inside the secure processor.

4. The method as described in claim 1 wherein the secure object comprises one of: workload code, workload data, and a combination of workload code and data.

5. The method as described in claim 1 further including securely delivering the secure object to the memory of the server entity over a privileged network that is inaccessible external to the server entity.

6. The method as described in claim 1 further including adjusting a composition of the server entity as the workload is being processed.

7. The method as described in claim 6 further including de-associating the memory in which the secure object is stored encrypted from the secure processor, suspending execution of the workload, and re-associating the memory to a second secure processor.

8. The method as described in claim 7 further including resuming execution of the workload in the second secure processor.

9. A system to protect information in a disaggregated computing environment, the disaggregated computing environment comprising a set of server resource pools including a secure processor pool, comprising:
    one or more hardware processors;
    computer memory holding computer program instructions executed by the hardware processors and operative to:
        respond to a workload request having a security requirement to instantiate, in real-time, a server entity composed of resources drawn from the server resource pools, the server entity including a secure processor drawn from the secure processor pool, and a memory drawn from a memory pool, wherein the secure processor is selected for inclusion in the instantiated server entity based upon the secure processor being listed in a privileged table indicative of which processors in the disaggregated computing environment are maintained in the secure processor pool;
        construct a secure object to execute in the server entity;
        associate cryptographic information with the server entity; and
        use the cryptographic information to configure the server entity such that the secure object is stored encrypted in the memory; wherein the secure object is in decrypted form only when the secure object is inside the secure processor during an execution of the secure object by the secure processor after retrieval from the memory.

10. The system as described in claim 9 wherein the cryptographic information comprises a key-pair uniquely associated with the secure processor.

11. The system as described in claim 10 wherein the key-pair comprises a private key, and an associated public key, wherein the secure object is constructed at least in part using the public key, and wherein the private key is used to decrypt to secure object into the decrypted form inside the secure processor.

12. The system as described in claim 9 wherein the secure object comprises one of: workload code, workload data, and a combination of workload code and data.

13. The system as described in claim 9 wherein the computer program instructions are further operative to securely deliver the secure object to the memory of the server entity, the secure object being delivered over a privileged network that is inaccessible external to the server entity.

14. The system as described in claim 9 wherein the computer program instructions are further operative to adjust a composition of the server entity as the workload is being processed.

15. The system as described in claim 14 wherein the computer program instructions are further operative to de-associate the memory in which the secure object is stored encrypted from the secure processor, suspend execution of the workload, and re-associate the memory to a second secure processor.

16. The system as described in claim 15 wherein the computer program instructions are further operative to resume execution of the workload in the second secure processor.

17. A computer program product in a non-transitory computer readable medium for use in a data processing system to protect information in a disaggregated computing environment, the disaggregated computing environment comprising a set of server resource pools including a secure processor pool, the computer program product holding computer program instructions executed in the data processing system and operative to:
respond to a workload request having a security requirement to instantiate, in real-time, a server entity composed of resources drawn from the server resource pools, the server entity including a secure processor drawn from the secure processor pool, and a memory drawn from a memory pool, wherein the secure processor is selected for inclusion in the instantiated server entity based upon the secure processor being listed in a privileged table indicative of which processors in the disaggregated computing environment are maintained in the secure processor pool;
construct a secure object to execute in the server entity;
associate cryptographic information with the server entity; and
use the cryptographic information to configure the server entity such that the secure object is stored encrypted in the memory; wherein the secure object is in decrypted form only when the secure object is inside the secure processor during an execution of the secure object by the secure processor after retrieval from the memory.

18. The computer program product as described in claim 17 wherein the cryptographic information comprises a key-pair uniquely associated with the secure processor.

19. The computer program product as described in claim 18 wherein the key-pair comprises a private key, and an associated public key, wherein the secure object is constructed at least in part using the public key, and wherein the private key is used to decrypt to secure object into the decrypted form inside the secure processor.

20. The computer program product as described in claim 15 wherein the secure object comprises one of: workload code, workload data, and a combination of workload code and data.

21. The computer program product as described in claim 17 wherein the computer program instructions are further operative to securely deliver the secure object to the memory of the server entity, the secure object being delivered over a privileged network that is inaccessible external to the server entity.

22. The computer program product as described in claim 17 wherein the computer program instructions are further operative to adjust a composition of the server entity as the workload is being processed.

23. The computer program product as described in claim 22 the computer program instructions are further operative to:
de-associate the memory in which the secure object is stored encrypted from the secure processor;
suspend execution of the workload;
re-associate the memory to a second secure processor; and
thereafter resume execution of the workload in the second secure processor.

24. The computer program product as described in claim 23 wherein the computer program instructions are further operative to resume execution of the workload in the second secure processor.

* * * * *